US012662374B2

(12) United States Patent
Blanc

(10) Patent No.: US 12,662,374 B2
(45) Date of Patent: Jun. 23, 2026

(54) LIQUID FORMULATION FOR HYDROGEN STORAGE

(71) Applicant: ARKEMA FRANCE, Colombes (FR)

(72) Inventor: Jérôme Blanc, Pierre-Benite Cedex (FR)

(73) Assignee: ARKEMA FRANCE, Colombes (FR)

( * ) Notice: Subject to any disclaimer, the term of this patent is extended or adjusted under 35 U.S.C. 154(b) by 277 days.

(21) Appl. No.: 17/999,567

(22) PCT Filed: Dec. 7, 2021

(86) PCT No.: PCT/FR2021/052221
§ 371 (c)(1),
(2) Date: Nov. 22, 2022

(87) PCT Pub. No.: WO2022/123165
PCT Pub. Date: Jun. 16, 2022

(65) Prior Publication Data

US 2024/0150167 A1 May 9, 2024

(30) Foreign Application Priority Data

Dec. 9, 2020 (FR) ...................................... 2012920

(51) Int. Cl.
*C01B 3/0015* (2026.01)

(52) U.S. Cl.
CPC ...... *C01B 3/0015* (2013.01); *C01B 2203/066* (2013.01)

(58) Field of Classification Search
None
See application file for complete search history.

(56) References Cited

U.S. PATENT DOCUMENTS

| | | | |
|---|---|---|---|
| 4,929,784 A | 5/1990 | Klinkmann et al. | |
| 5,202,514 A * | 4/1993 | Commandeur ..... | C07C 7/14841 585/446 |
| 5,446,228 A | 8/1995 | Commandeur et al. | |
| 10,450,194 B2 | 10/2019 | Boesmann et al. | |
| 2016/0301093 A1 | 10/2016 | Bosmann et al. | |
| 2018/0053957 A1 * | 2/2018 | Pez ..................... | H01M 4/9083 |

FOREIGN PATENT DOCUMENTS

| | | | |
|---|---|---|---|
| AU | 2021396717 A1 | | 12/2022 |
| EP | 2925669 A1 | | 10/2015 |
| FR | 2816030 | * | 5/2002 |
| JP | 863224110 A | | 9/1988 |
| JP | 2003528970 | * | 9/2003 |
| WO | 2014082801 A1 | | 6/2014 |
| WO | WO2019/171001 | * | 9/2019 |
| WO | WO2020064222 | * | 4/2020 |
| WO | 2022123165 A1 | | 6/2022 |

OTHER PUBLICATIONS

Berger, Noelle. "Jarylec. Dielectric Liquid for Capacitors". Prodelec. Jan. 2001. (Year: 2001).*
Muslim, Joko. "Study of dielectric liquids as alternative encapsulant for high temperature . . . " HAL open science. Jul. 2020. (Year: 2020).*
ISA/EP; International Search Report and Written Opinion for International Patent Application No. PCT/FR2021/052221 dated Apr. 7, 2022, 13 pages.

* cited by examiner

*Primary Examiner* — Sheng H Davis

(74) *Attorney, Agent, or Firm* — Rimon P.C.; Allyn B. Elliott

(57) ABSTRACT

The present invention relates to a liquid formulation comprising an amount greater than or equal to 50% by weight of benzyl toluene and an amount less than or equal to 10 ppm by weight of at least one hydrocarbon having a molar mass less than or equal to 100 g mol$^{-1}$. The invention also relates to the use of said formulation, comprising an amount less than or equal to 10 ppm by weight of light hydrocarbon, as LOHC for producing hydrogen.

10 Claims, No Drawings

LIQUID FORMULATION FOR HYDROGEN STORAGE

CROSS-REFERENCE TO RELATED APPLICATIONS

This application is a U.S. National Stage application of International Patent Application No. PCT/FR2021/052221, filed on Dec. 7, 2021, which claims the benefit of French Patent Application No. FR2012920, filed on Dec. 9, 2020.

The present invention relates to the field of liquid formulations capable of transporting hydrogen, and more particularly the field of benzyltoluene-based formulations capable of transporting hydrogen.

Hydrogen today represents one alternative to the fossil, natural or electrical energy sources. Storing and transporting this hydrogen energy source, however, remains a major challenge for the rapid and accessible development of this energy source.

Various approaches to the easier storage and transportation of this very volatile and highly explosive gas have been studied, including pressurized storage, cryogenic storage, and storage on supports. The types of support that may be contemplated include the technology based on liquid organic hydrogen carriers (LOHCs), which is a promising technology of particular interest for long-distance transport with costs entirely compatible with a large-scale development.

The principle of this LOHC technology consists in fixing hydrogen on a support molecule, which is preferably and most often liquid at ambient temperature, in a hydrogenation step, then in releasing the fixed hydrogen, close to the site of consumption, in a dehydrogenation step.

Among the LOHC molecules studied today, aromatic liquids with two or three rings, such as, for example, benzyltoluene (BT) and/or dibenzyltoluene (DBT) which have already been the subject of numerous studies and patent applications, represent molecules particularly well suited to this use. Patent EP 2 925 669 thus demonstrates the use of BT and/or DBT in LOHC technology, and describes the hydrogenation and dehydrogenation operations of these fluids for hydrogen storage and release.

Beyond the instantaneous performance quality of the hydrogenation and dehydrogenation steps, the sequence of the cycles and the maintenance of the performance qualities (hydrogen fixation/release yield) and also the purity of the hydrogen extracted (or released) during the dehydrogenation step are key points for the economic aspect of this technology.

This is because the hydrogen resulting from this LOHC technology finds uses in a great many fields, such as, for example, in fuel cells, and in diverse industrial processes, or else as fuel for all means of transport, such as trains, boats, trucks, automobiles, aircraft, etc. Any impurity present in the hydrogen, even in trace amounts, could have a negative impact both on the hydrogenation/dehydrogenation process in terms of yield, and on the quality of the products manufactured or else on the yields in the end uses of the hydrogen produced by this technique.

To overcome these potential problems, one of the solutions is for the hydrogen released during the dehydrogenation step to be as pure as possible. However, the hydrogen released during the dehydrogenation step inevitably entrains with it impurities resulting from organic compounds often present in the organic liquid to be dehydrogenated.

These impurities are of various kinds, and may be present in greater or lesser amounts, not only in the original LOHC fluid but also in the LOHC fluid after it has undergone numerous hydrogenation/dehydrogenation cycles (called "LOHC fluid" in the remainder of the present specification). Consequently, there remains a need for LOHC fluids that perform, from the standpoints both of yield in storage terms (hydrogenation/dehydrogenation cycles) and of the purity of the hydrogen released during the dehydrogenation step. Still further objectives will become apparent in the continuation of the description of the invention, which is set out in more detail below.

The Applicant has now found an LOHC fluid formulation entirely suitable for the storage and transport of hydrogen that is capable of releasing high-purity hydrogen during the dehydrogenation step.

In a first aspect, therefore, the present invention relates to a liquid formulation, based on benzyltoluene and containing very low levels of light hydrocarbons. This type of formulation particularly enables the overcoming of some or all of the drawbacks raised in the prior art for LOHC fluids, meeting in particular the requirements of storage, transport and extraction of hydrogen, under optimal industrial and economic conditions, and enabling the release, during the step of dehydrogenation of said formulation, of hydrogen having a high level of purity, and particularly of hydrogen having very low levels of light hydrocarbons, the latter being particularly detrimental for the uses of hydrogen in a large number of applications, such as fuel cells, for example.

More specifically, the present invention relates to a liquid formulation comprising:

an amount of greater than or equal to 50%, preferably greater than or equal to 60%, more preferably greater than or equal to 70%, better still greater than or equal to 80%, and most preferably greater than or equal to 90% by weight of benzyltoluene (BT), relative to the total weight of the formulation, and an amount of less than or equal to 10 ppm by weight of at least one hydrocarbon having a molar mass of less than or equal to 100 g mol$^{-1}$.

The formulation according to the present invention is a formulation that is liquid at ambient temperature and ambient pressure, i.e., at 25° C. and 1 atmosphere (1013 mbar or 1013 hPa).

As indicated earlier, the formulation according to the present invention comprises an amount of greater than or equal to 50% by weight of BT, preferably greater than or equal to 60%, more preferably greater than or equal to 70%, better still greater than or equal to 80%, and most preferably greater than or equal to 90% by weight of BT. In one especially preferred embodiment, the formulation according to the present invention comprises an amount of greater than or equal to 98% by weight of benzyltoluene (BT).

The formulation according to the present invention preferably comprises benzyltoluene alone, or optionally with one or more other LOHC fluids as indicated later on, in other words with no component other than impurities in trace form and in particular at least one light hydrocarbon (molar mass of less than or equal to 100 g mol$^{-1}$), but present in an amount of less than or equal to 10 ppm by weight. Accordingly, and in one preferred embodiment, the formulation according to the invention comprises an amount of less than or equal to 99.99% by weight of BT, preferably less than or equal to 99.95% by weight of BT, more preferably less than or equal to 99.9% by weight of BT.

As indicated earlier, the formulation may also comprise one or more other LOHC fluids well-known to those skilled in the art, such as those obtained from petroleum products and/or from products synthesized from petroleum products, or else obtained from renewable products and/or from products synthesized from renewable products.

Such other LOHC fluids are for example, and without limitation, those selected from dibenzyltoluene (DBT), diphenylethane (DPE), diphenylmethane (DPM), ditolyl ether (DT), phenylxylylethane (PXE), mono- and bixylylx-ylenes, 1,2,3,4-tetrahydro(1-phenylethyl)naphthalene, diiso-propylnaphthalene, monoisopropylbiphenyl, phenyleth-ylphenylethane (PEPE), N-ethylcarbazole, phenylpyridines, tolylpyridines, diphenylpyridines, dipyridylbenzenes, dipyridinetoluenes, and mixtures of two or more thereof, in any proportions, to state only the major known organic fluids that can be used in the context of the present invention.

According to one preferred embodiment of the present invention, the formulation comprises at least 50% by weight of benzyltoluene (BT), and of dibenzyltoluene (DBT). According to one embodiment of the present invention, the formulation comprises from 70% to 80% by weight of BT and from 20% to 30% by weight of DBT (relative to the total weight of BT+DBT). According to another embodiment, the formulation comprises from 80% to 99.9% by weight of BT and from 0.1% to 20% by weight of DBT (relative to the total weight of BT+DBT), the formulation preferably comprising from 90% to 99.9% by weight of BT and from 0.1% to 10% by weight of DBT (relative to the total weight of BT+DBT), and the formulation more preferably comprising from 90% to 99.5% by weight of BT and from 0.5% to 10% by weight of DBT (relative to the total weight of BT+DBT).

As indicated earlier, the formulation according to the present invention comprises an amount of less than or equal to 10 ppm, preferably less than or equal to 5 ppm, more preferably less than or equal to 2 ppm by weight of at least one hydrocarbon having a molar mass of less than or equal to 100 g mol$^{-1}$. Indeed, it has been observed that the hydrocarbons, and especially the "light" hydrocarbons, and more precisely the hydrocarbons having a molar mass of less than or equal to 100 g mol$^{-1}$, very often cause many drawbacks, whether during the operations of hydrogenation/ dehydrogenation to which the LOHC formulations are sub-jected, but also in the hydrogen released during operations of dehydrogenation, hydrogen that may then not have the degree of purity required for its intended applications.

The reason is that light hydrocarbons can disturb the hydrogenation/dehydrogenation reactions, typically by deg-radation and/or deactivation—total or partial—of at least some of the catalysts used, by lowering the yields of the hydrogenation/dehydrogenation cycles, or by any other effect that disturbs the operating conditions of said hydro-genation/dehydrogenation cycles.

Furthermore, and more specifically concerning the quality of the hydrogen released during operations of dehydroge-nation of the formulation according to the present invention, it has been observed that the presence of light hydrocarbons in a formulation intended for storage and subsequent release of hydrogen gives rise to the presence of at least as great an amount of said light hydrocarbons in the hydrogen released. As already indicated above, the presence of such impurities in the hydrogen, especially in an amount of more than 10 ppm, may prove disruptive or even prohibitive, in certain uses, such as, for example, for fuel cells, and any other industrial applications requiring the use of high-purity hydrogen, such as the electronics sector for producing microprocessors, semiconductors, etc.

In one preferred embodiment of the present invention, the light hydrocarbons are present in the formulation in an amount of between 0.01 ppm by weight and 10 ppm by weight, preferably between 0.01 ppm by weight and 5 ppm by weight, more preferably between 0.01 ppm by weight and 2 ppm by weight. According to another preferred embodi-ment, the light hydrocarbons are present in the formulation in an amount of between 0.05 ppm by weight and 10 ppm by weight, preferably between 0.05 ppm by weight and 5 ppm by weight, more preferably between 0.05 ppm by weight and 2 ppm by weight.

According to yet another preferred embodiment, the light hydrocarbons are present in the formulation in an amount of between 0.1 ppm by weight and 10 ppm by weight, prefer-ably between 0.1 ppm by weight and 5 ppm by weight, more preferably between 0.1 ppm by weight and 2 ppm by weight.

"Light hydrocarbons" in the sense of the present invention are hydrocarbons with a molar mass of less than or equal to 100 g mol$^{-1}$. Hydrocarbons, generally speaking, are hydro-carbon compounds in the broad sense and well-known to those skilled in the art. "Light hydrocarbons" are hydrocar-bon compounds with a molar mass of less than or equal to 100 g mol$^{-1}$ and comprising carbon, hydrogen and option-ally one or more heteroatoms selected from oxygen, sulfur and nitrogen. According to another preferred embodiment, light hydrocarbons are hydrocarbon compounds with a molar mass of less than or equal to 100 g mol$^{-1}$ and comprising 6, 7 or 8 carbon atoms, and more preferably light hydrocarbons are those selected from, but not limited to, benzene and toluene.

Although not forming a preferred embodiment, the for-mulation according to the invention may further comprise one or more additives and/or fillers well-known to those skilled in the art and selected for example, and without limitation, from antioxidants, pigments, dyes, flavors, odor masking agents, viscosity modifiers, passivating agents, pour point depressants, decomposition inhibitors, and mix-tures thereof.

The antioxidants that may advantageously be used in the formulation of the invention may include, as nonlimiting examples, phenolic antioxidants, such as, for example, dibutylhydroxytoluene, butylhydroxyanisole, tocopherols, and the acetates of these phenolic antioxidants. Further instances are the antioxidants of amine type, such as, for example, phenyl-α-naphthylamine, of diamine type, as for example N,N'-di(2-naphthyl)-para-phenylenediamine, but also ascorbic acid and its salts, esters of ascorbic acid, alone or as mixtures of two or more thereof or with other com-ponents, as for example green tea extracts and coffee extracts.

In one embodiment, the present invention relates to a formulation comprising:

an amount of greater than or equal to 50%, preferably greater than or equal to 60%, more preferably greater than or equal to 70%, better still greater than or equal to 80%, and most preferably greater than or equal to 90% by weight of benzyltoluene (BT), and optionally at least one other LOHC fluid, other than the BT, preferably optionally at least one other LOHC fluid which is dibenzyltoluene (DBT), an amount of less than or equal to 10 ppm by weight, preferably between 0.01 ppm and 10 ppm by weight, of at least one hydrocarbon having a molar mass of less than or equal to 100 g mol$^{-1}$, optionally at least one additive, as defined earlier.

In another embodiment, the present invention relates to a formulation comprising:

an amount of greater than or equal to 50%, preferably greater than or equal to 60%, more preferably greater than or equal to 70%, better still greater than or equal to 80%, and most preferably greater than or equal to 90% by weight of benzyltoluene (BT), and an amount of dibenzyltoluene (DBT) of between 0.1% and 30% by weight, relative to the total weight of the LOHC fluids present in said formulation, an amount of less than or equal to 10 ppm, and preferably between 0.01 ppm and 10 ppm, of at least one hydrocarbon having a molar mass of less than or equal to 100 g $mol^{-1}$, and preferably of at least one hydrocarbon selected from those comprising 6, 7 or 8 carbon atoms, preferably selected from benzene and toluene and the mixtures thereof in any proportions, optionally at least one additive and/or filler, as defined earlier.

Benzyltoluene (BT) is a well-known, commercially available compound whose method of preparation is likewise well-known to those skilled in the art. For example, BT is readily preparable by catalytic reaction of toluene with chlorotoluene, by techniques now well-known to those skilled in the art, and particularly as described in patent EP0435737.

The crude BT synthesis products, but also the BT-based LOHC fluids that have been engaged in hydrogenation/dehydrogenation cycles, may therefore contain variable amounts of at least one light hydrocarbon, as described earlier. The formulation according to the present invention may therefore be prepared, for example and typically, from these crude synthesis products or BT-based LOHC liquids, by any methods well-known to those skilled in the art.

Accordingly, and as nonlimiting examples, the formulation according to the present invention may advantageously be prepared by treating a formulation comprising at least 50% of BT and at least one light hydrocarbon, in an amount of more than 10 ppm by weight, by distillation, recrystallization, thin-film evaporation, and other methods or else combinations of one or more of these methods.

Other methods also well-known to those skilled in the art may be employed, to complement or to replace the methods described above for preparing the formulation according to the present invention, including, as nonlimiting examples, treatments on filtering agents and/or adsorbents.

The filtering agents which can be used in the context of the present invention may be of any type and are well-known to those skilled in the art. The filtering agents which have proved to be the most suitable are adsorbent filtering agents, and more particularly filtering agents comprising one or more compounds chosen from minerals based on silicates, carbonates, coal, and also mixtures of two or more of these minerals in any proportions.

Nonlimiting examples include mineral or organic filtering agents, and particularly those selected from clays, zeolites, diatomaceous earths, ceramics, carbonates, and coal derivatives, and also mixtures of two or more thereof, in any proportions.

Mention may more particularly be made, as filtering, adsorbing, and filtering-adsorbing agents, of the following:

clays, including silicates, and for example magnesium silicates, such as, and without limitation, attapulgites, montmorillonites, selenites, bentonites, talcs, etc., natural or synthetic aluminum silicates, particularly kaolins, kaolinites, zeolites, carbonates, for example calcium and/or magnesium carbonates, and more particularly those known under the names limestone or chalks, derivatives of coal, wood, shells, for example coconut shells, olive pits or husks, and more generally those known under the name of activated carbons, and others, and mixtures thereof.

Silicates, particularly clays and zeolites, have proven especially effective for preparing the formulation of the present invention. Silicates, indeed, have proven especially suitable for removing, or at least for substantially reducing, one or more light hydrocarbon(s) present in a formulation comprising an amount of greater than or equal to 50% by weight of benzyltoluene (BT).

According to one especially preferred embodiment of the present invention, examples of filtering agents that can be used advantageously for preparing the formulation of the present invention include the attapulgite Microsorb® 16/30 LVM from BASF (example of magnesium-aluminum clay with the chemical formula $(Mg, Al)_5Si_8O_{22}(OH)_4, SiO_2$), Amcol Rafinol 900 FF from Minerals Technologies, Amcol Rafinol 920 FF from Minerals Technologies, Amcol Mineral Bent (aluminum hydrosilicate) from Minerals Technologies, and Siliporite® products, in particular MK30B0 and MK3062, from Arkema (preparations based on aluminosilicate zeolite).

In one especially preferred embodiment of the present invention, the filtering agent used for preparing the formulation comprising a content of at least one light hydrocarbon of less than or equal to 10 ppm by weight is selected from molecular sieves (also called "zeolitic adsorbents"), especially molecular sieves enabling the adsorption, as selectively as possible, of the light hydrocarbons, in particular of the hydrocarbons having a molar mass of less than or equal to 100 g $mol^{-1}$.

The most appropriate zeolitic adsorbent materials, i.e. materials comprising one or more zeolites, are advantageously selected from molecular sieves based on synthetic zeolites which, by virtue of the wide variety of processes by which they are prepared, offer a great diversity of parameters that are amenable to fine adjustment, such as, for example, the thermal stability, the mechanical strength, or else the capacity for regeneration, in order to meet the specific criteria required for the envisaged use.

According to one preferred embodiment, the zeolitic adsorbent materials most suitable for use in the context of the present invention include natural or synthetic zeolites, and more particularly the zeolitic adsorbent materials selected from natural zeolites, as for example chabazite, and from synthetic zeolites, especially the zeolites of type LTA, the zeolites of type FAU, the zeolites of type EMT, the zeolites of type MFI, and the zeolites of type BEA.

These various types of zeolites are readily available to those skilled in the art commercially or are readily synthesizable by means of known procedures available in the scientific literature and in the patent literature. Moreover, the various types of zeolite are clearly defined and set out, for example, in the "Atlas of Zeolite Framework Types", 5th edition, (2001), Elsevier.

According to another aspect, the present invention relates to the use of a formulation as defined above as LOHC fluid for producing hydrogen comprising a low level of impurities, and especially for producing hydrogen comprising an amount of less than or equal to 10 ppm by weight of at least one light hydrocarbon, and in particular of at least one hydrocarbon having a molar mass of less than or equal to 100 g $mol^{-1}$.

By virtue of the formulation of the present invention, the performance levels of the hydrogenation/dehydrogenation cycles are facilitated/enhanced, by virtue of reduced degradation of the catalyst over successive cycles, particularly because the LOHC formulation of the invention contains only traces of light hydrocarbons, as set out above, these hydrocarbons being known to be poisons to the catalysts presently used in the hydrogenation/dehydrogenation reactions.

Furthermore, the hydrogen stored and then released during the dehydrogenation step is a high-purity hydrogen which may thus be used in a very large number of applications, especially for fuel cells, and all the other industrial applications requiring the use of high-purity hydrogen, such as the electronics sector for producing microprocessors, semiconductors, etc.

The invention claimed is:

1. A liquid formulation comprising:

an amount of greater than or equal to 50%, by weight of benzyltoluene (BT), relative to the total weight of the formulation, and at least one hydrocarbon having a molar mass of less than or equal to $100$ g $mol^{-1}$ in an amount of less than or equal to 10 ppm by weight.

2. The formulation as claimed in claim 1, comprising an amount of greater than or equal to 98% by weight of benzyltoluene.

3. The formulation as claimed in claim 1, comprising one or more other liquid organic hydrogen carriers (LOHC) fluids obtained from petroleum products and/or from products synthesized from petroleum products, or else obtained from renewable products and/or from products synthesized from renewable products.

4. The formulation as claimed in claim 1, comprising one or more other LOHC fluids selected from the group consisting of dibenzyltoluene, diphenylethane, diphenylmethane, ditolyl ether, phenylxylylethane, mono-and bixylylxylenes, 1,2,3,4-tetrahydro(1-phenylethyl)naphthalene, diisopropylnaphthalene, monoisopropylbiphenyl, phenylethylphenylethane, N-ethylcarbazole, phenylpyridines, tolylpyridines, diphenylpyridines, dipyridylbenzenes, dipyridinetoluenes, and mixtures of two or more thereof, in any proportions.

5. The formulation as claimed in claim 1, comprising at least 50% by weight of benzyltoluene and dibenzyltoluene, relative to the total weight of benzyltoluene+dibenzyltoluene.

6. The formulation as claimed in claim 1, comprising from 80% to 99.9% by weight of benzyltoluene and from 0.1% to 20% by weight of dibenzyltoluene (relative to the total weight of benzyltoluene +dibenzyltoluene).

7. The formulation as claimed in claim 1, in which the amount of at least one hydrocarbon having a molar mass of less than or equal to $100$ g $mol^{-1}$ is less than or equal to 10 ppm by weight.

8. The formulation as claimed in claim 1, in which said at least one hydrocarbon is selected from hydrocarbon compounds having a molar mass of less than or equal to 100 g $mol^{-1}$ and comprising carbon, hydrogen and optionally one or more heteroatoms selected from the group consisting of oxygen, sulfur and nitrogen.

9. A method of fixing hydrogen using the formulation as claimed in claim 1, as LOHC fluid for producing hydrogen comprising an amount of less than or equal to 10 ppm by weight of a hydrocarbon having a molar mass of less than or equal to 100 g $mol^{-1}$.

10. The method as claimed in claim 9, for producing hydrogen that can be used in fuel cells, or in the electronics sector for producing microprocessors, semiconductors, etc.

* * * * *